Dec. 8, 1936. D. K. ALLISON 2,063,140
pH CONTROL
Filed May 17, 1932 4 Sheets-Sheet 2

INVENTOR:
Donald K. Allison

Dec. 8, 1936.　　　D. K. ALLISON　　　2,063,140
pH CONTROL
Filed May 17, 1932　　　4 Sheets-Sheet 3

INVENTOR:
Donald K. Allison (−LOG₁₀ HYDROGEN-ION CONCENTRATION, MOLES PER LITER.)

DENSITY AND TRANSMISSION OF BROM THYMOL BLUE AT 440 AND 615 Mµ, AND OF PHENOLPHTHALIEN AT 550 Mµ

Patented Dec. 8, 1936

2,063,140

UNITED STATES PATENT OFFICE 2,063,140 pH CONTROL

Donald K. Allison, Los Angeles, Calif.

Application May 17, 1932, Serial No. 611,919

3 Claims. (Cl. 23—230)

My invention pertains to the chemical process industries, and particularly to those industries in which it is desirable or essential to maintain close control over the acidity or alkalinity of dilute solutions. In many industries, economy of operation and uniformly satisfactory quality of results depend upon the accuracy of this control; common examples are the textile manufacturing and dyeing, leather tanning, sugar refining, food canning, ore flotation, photographic emulsion manufacturing and processing, paper manufacturing, and dairy industries.

In dilute solutions, whether alkaline or acid, the most convenient method of expressing alkalinity or acidity is in terms of the concentration of hydrogen ions in the solution, and various methods of measuring, recording and controlling this concentration have been proposed or used. These methods, however, have all been subject to one or more of the following handicaps or limitations:

1. They depend upon human observation.
2. They may measure concentrations, but not record or control them, or they may measure and record but not control.
3. Their range is limited.
4. They cannot be universally used on all solutions; fundamentally different types of measurement and control are necessary in different types of solution.
5. They are intermittent in action.
6. Their accuracy is affected by variations in color or turbidity of the solution.

Among the objects of my invention are the following:

1. To provide a method of automatically, continuously and simultaneously measuring, recording and controlling the hydrogen ion concentration of solutions.
2. To provide a device for carrying out the above mentioned method.
3. To minimize or eliminate the human element in its operation.
4. To provide a system which is limited in range only by the chemical indicators available.
5. To provide a method and apparatus which may be used interchangeably on all translucent solutions requiring control of hydrogen ion concentration, regardless of color, turbidity, oxidizing or reducing characteristics.
6. To utilize photo-electric cells, or other devices responsive to incident radiant energy, to detect changes in physical characteristics of the solution with variation in its hydrogen ion concentration, and to set into operation means to correct such variation.

Other objects, advantages and features of novelty will be apparent from the specifications and drawings.

In this specification, the term "pH" will be used to simplify phraseology and render it consistent with that commonly in use. Hydrogen ion concentrations, as most frequently measured and used in the art, vary from $10^{0.0}$ to $10^{-14.0}$ moles per liter, that is from 1.0 to 0.00000000000001 moles per liter. For convenience, the expression "pH" has been selected to indicate the negative logarithm to the base 10 of the hydrogen ion concentration. Thus "hydrogen ion concentration of $10^{0.0}$" is designated as "pH 0.0"; "hydrogen ion concentration of $10^{-14.0}$" is designated as "pH 14.0".

Reference will also be made to "indicators." In the sense in which the word is here used, it means chemical substances which in solution will change color with change in alkalinity or acidity of the solution, that is, with change of hydrogen ion concentration. Indicators familiar to the layman are litmus and phenolphthalein; the former turns violet in definitely alkaline solutions and red in definitely acid ones; the latter is reddish purple in alkaline solutions and colorless in acid ones.

It is an important characteristic of indicators that different indicators pass through the change of color at different hydrogen ion concentrations, and that above and below certain concentrations the color remains unchanged. Thus litmus is violet at values above pH 8.0 and red at values below pH 5.0. In the intermediate range of pH values the color is a mixture of violet and red but it is always the same for a given pH value and concentration of indicator. Dibromo-orthocresolsulphonphthalein is yellow at pH 5.2 and violet at pH 6.8, with mixed color between these two limits. As an indicator, it is said to have a "range" of pH 5.2 to 6.8. The range of litmus thus includes that of dibromoorthocresolsulphonphthalein and will be seen to be much broader. Phenolsulphonphthalein is yellow at pH values of 6.8 or less, and red at pH values of 8.5 or more. Its range immediately adjoins that of dibromoorthocresolsulphonphthalein and overlaps that of litmus. Depending upon the pH value which it is desired to obtain, and the accuracy with which control must be maintained, it is possible to select for use in my apparatus indicators which will cover the entire range of pH values from 0.0 to 14.0.

When in the following description and claims the term "light" is used, it will be understood that this includes the entire range of wave lengths from the infra-red to ultra-violet inclusive, and is not meant as limiting the light to the visible spectrum.

Figures 6, 7, 8, and 9 are transmission curves for certain indicators under various conditions, to which reference will be made in the explanation of the mode of operation of the various forms of my invention.

Figure 1:
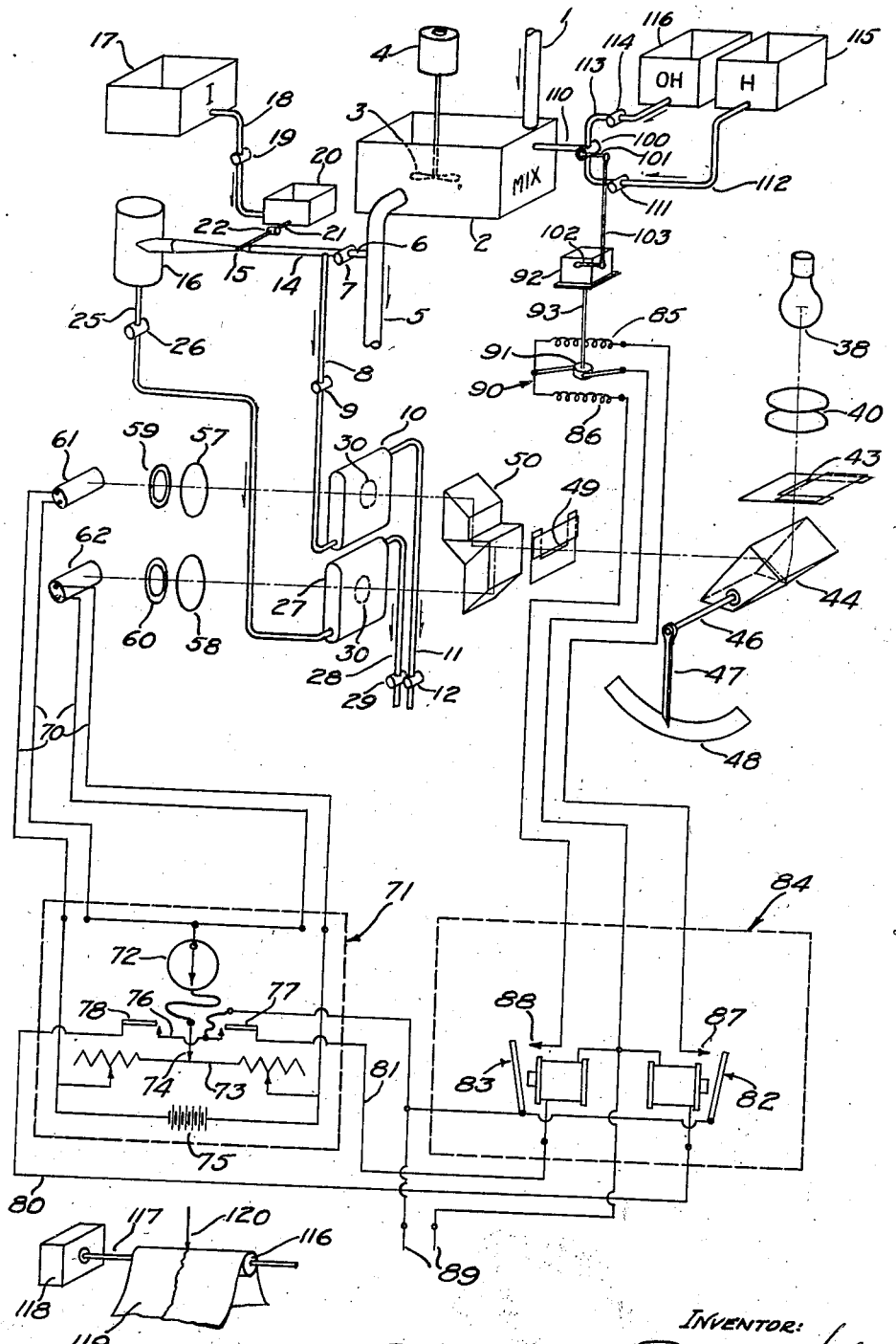
Figure 1 is a schematic perspective view showing the complete apparatus of the preferred embodiment of my invention, with a wiring diagram.

Referring now to Figure 1, a pipe 1 supplies the fluid over which hydrogen ion control is to be maintained to a mixing tank 2, where it is continuously agitated by an agitator 3, driven by a motor 4, and from which it flows through a pipe 5 to the process.

From the pipe 5 a sample of the processing solution is continually drawn off for testing purposes through a line 6 and a valve 7. A portion of this solution passes through a line 8, a valve 9, a comparison cell 10, a line 11, and a valve 12, after which it may be returned to the process or discarded. Another portion of the solution passes through a line 14, and a Venturi tube 15 to a mixing chamber 16. A suitable solution of indicator stored in an indicator storage tank 17, also marked "I", flows through a line 18 and a valve 19 to a constant level tank 20, in which the solution is maintained at a constant level by a float valve (not shown). From the constant level tank 20 the indicator solution flows through a pipe 21 and a valve 22 to the throat of the Venturi tube 15, where it is entrained by the processing solution and carried into the mixing chamber 16.

By means well known in the art the constant level tank 20 and the Venturi tube 15 are so positioned relative to one another that the proportion of indicator solution drawn into the sample of processing solution will be constant over a wide variation in rate of flow of the latter.

The Venturi tube 15 discharges tangentially into the mixing chamber 16, thus tending to maintain agitation therein, and ensure complete mixing of the sample of processing solution and the accompanying indicator solution, but auxiliary mixing means may be supplied if desired.

From the mixing tank 16 the mixture of processing solution and indicator solution flows through a pipe 25 and a valve 26 to a solution cell 27, from which it flows through a pipe 28 and a valve 29 to a recovery sump or waste.

The comparison cell 10 and the solution cell 27 are formed with flat parallel faces of transparent or translucent material, and are covered with a black paint or equivalent opaque material except on a small circular area 30 on each face.

Figure 2:
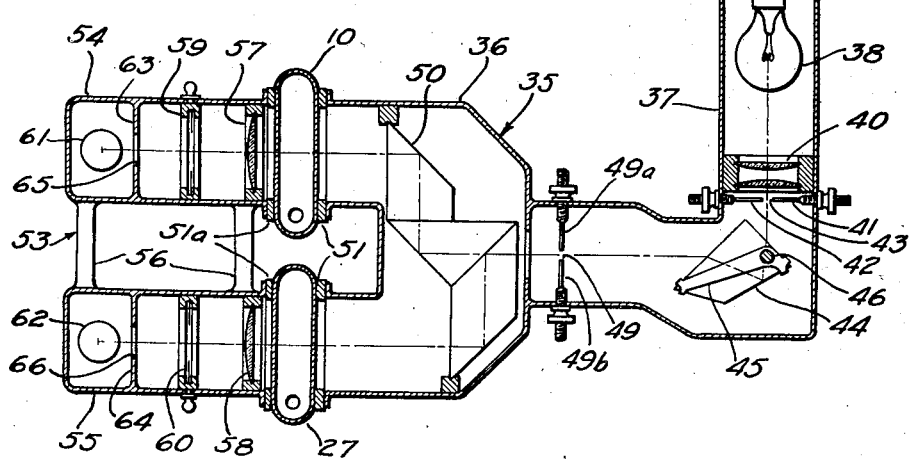
Figure 2 is an elevational section through the optical system and liquid cells of the preferred embodiment shown in Figure 1.

Referring now particularly to Figure 2, 35 is an optical housing composed of a prism housing 36 and a spectrometer housing 37. An incandescent lamp 38 is supported on a base 39 in a portion of the spectrometer housing 37. Light from the incandescent lamp 38 passes through a collimator 40, and between adjustable blades 41 and 42 which cooperate to form an adjustable slit 43. After passing through the adjustable slit 43 the light strikes a constant deviation dispersion prism 44, which is mounted in a frame 45 in a manner such that it may be rotated by a shaft 46. Attached to the end of the shaft 46 is an adjusting lever 47, by means of which the shaft 46 and the constant deviation dispersion prism 44 may be rotated to any desired position on an indicator scale 48. By means not shown, the lever 47 may be locked in any selected position. From the constant deviation dispersion prism 44 the light passes through an adjustable slit 49 formed by a pair of adjustable blades 49a and 49b, and into a beam-splitting prism assembly 50.

The entire optical housing 35 is held against one face of the comparison cell 10 and the solution cell 27 by means not shown, with gaskets 51 serving to exclude extraneous light.

A photo cell housing 53 composed of an upper tube 54 and a lower tube 55 is mounted by means not shown against the opposite faces of the comparison cell 10 and the solution cell 27, and a light seal is provided by gaskets 51a.

In the upper tube 54 and the lower tube 55 are mounted as shown plano-convex lenses 57 and 58, adjustable iris diaphragms 59 and 60, and photo-electric cells 61 and 62. Walls 63 and 64 in the upper and lower tubes 54 and 55 are provided with ports 65 and 66 in line with the windows (not shown) of the photoelectric cells 61 and 62.

It will be seen that the two beams of light from the light-splitting prism assembly 50 pass through the comparison cell 10 and the solution cell 27, are converged by the plano-convex lenses 57 and 58, and directed through the adjustable iris diaphragms 59 and 60 and the ports 65 and 66 onto the photo-electric cells 61 and 62.

To complete my apparatus, I may use various control devices which are well known in the art, and for the purposes of demonstrating the complete operation of my apparatus and method, in Figure 1 I have shown diagrammatically the principal circuits of one such device. Since the particular device thus shown is well known in the art, the complete and detailed circuits necessary to the automatic functioning thereof are omitted for the sake of clarity.

For use with the device I have illustrated, the photo-electric cells 61 and 62 should be of the resistance type, exemplified by selenium cells, in which the electrical resistance of the cell varies as an inverse function of the incident radiant energy. The photo-electric cells 61 and 62 are connected by leads 70 to the terminals of an automatic bridge 71, in which a galvanometer 72 is connected on one side to one pair of bridge terminals and on the other side to a slide wire resistance 73 by a movable contact 74. A battery 75 is connected across the ends of the slide wire resistance 73 and to the other two bridge terminals. Insulated from but movably associated with the movable contact 74 is a contact bar 76, on either end of which is a contact point which may touch an adjustable contact 77 or an adjustable contact 78, with movement of the movable contact 74.

The adjustable contacts 77 and 78 are connected by leads 80 and 81 to the energizing coils of relay switches 82 and 83, in a relay panel 84. A forward field coil 85 and a reverse field coil 86 of a reversible motor 90 are connected to the main stationary contacts 87 and 88 of the relay switches 82 and 83. Power supply lines 89 supply current to the contact bar 76, the relay panel 84, and the reversible motor 90, as shown in the wiring diagram.

An armature 91 of the reversible motor 90 drives a valve control mechanism 92 by means of a shaft 93. A three way valve 100 is connected to and operated by the valve control mechanism 92 by means of levers 101 and 102, and a rod 103.

A pipe 110 connects the common discharge of the three way valve 100 with the mixing tank 2. A valve 111 and a pipe 112 connect one inlet of the three way valve 100 to an acid storage tank 115, also marked "H". A pipe 113 and a valve 114 connect the other inlet of the three way valve 100 with an hydroxide storage tank 116, also marked "OH".

In the lower left hand corner of Figure 1, detached from the previously described portion of this figure, are shown the essential elements of the recording mechanism of the apparatus. These elements here shown are normally integral with the automatic bridge, but for purposes of clarity they have been shown in this isolated manner. A recording drum 116 is mounted upon a shaft 117 and driven at a uniform speed by an electrical or clockwork mechanism 118. A strip of paper 119 is continuously moved under a recording pointer 120 by the drum 116. The recording pointer 120 is mechanically connected by means not shown to the sliding contact 74, so that its movement along an element of the drum 116 is a direct function of any movement of the sliding contact 74. Since movement of the sliding contact 74 is in turn a function of variation of the hydrogen ion concentration of the solution, from the value at which the automatic bridge may be calibrated, the line inscribed by the recording pointer 120 upon the sheet of paper 119 will give a continuous record of variations from the normal setting, and with properly ruled graph paper will give a direct reading record of pH values plotted against time. The position of the recording pointer 120 relative to the graph paper will also provide visual measurement and indication of instantaneous pH values at the time of observation.

Figure 6:
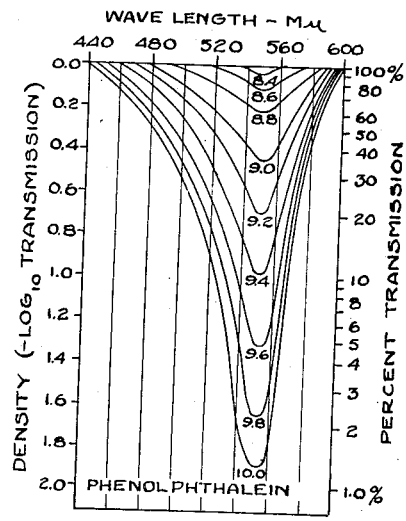

In order to study the operation of my device, let us assume that it is to be used to hold a processing solution at or near a pH of 9.4. For this purpose we should select an indicator of which the range will extend approximately equal distances either side of the pH value. Various indicators are available, but for illustrative purposes I have selected phenolphthalein, which is colorless at pH 8.3 or less, bright red at pH 10.0 or more, and passes through an infinite series of color gradations with change of pH between these two limits. Figure 6 shows characteristic transmission curves for phenolphthalein, taken from The Determination of Hyrogen Ions, by Clark, after Brode, J. Am. Chem. Soc., 46, 581. The quantitative values of transmission here shown correspond to a thickness of solution cell, or length of light path through the solution, of 5.0 cm., and to an indicator concentration of 0.10 gm. per liter. For any other length of light path or concentration, the quantitative values of transmission would be different, but the characteristic shape of the family of curves would remain the same, and the region of greatest rate of change of transmission with respect to change of pH would still be in the neighborhood of 550 millimicrons.

Assuming now that we will use phenolphthalein for an indicator, we must calibrate my device before it can be used for control of processing solution. The entire system is thoroughly cleaned and drained, and all valves are closed. The acid storage tank 115 and the hydroxide storage tank 116 are filled with suitable solutions for admixture to the processing solution to correct variations in pH thereof. The indicator storage tank 17 is filled with a suitable solution of phenolphthalein. The mixing tank 2 is filled with a solution at the normal pH of 9.4. This may be either normal processing solution or a specially prepared buffer solution, of which the pH has been determined by any convenient laboratory procedure.

The valve 19 is now opened, permitting the constant level tank 20 to fill with indicator solution to the normal level, and the valves 7, 9, 12, 26, and 29 are adjusted to give a small but continuous flow of solution through the comparison cell 10 and the solution cell 27. The valve 22 is now opened, and the Venturi tube 15 is permitted to draw in indicator solution in normal proportions. When the solution cell 27 is full of the properly proportioned mixture of processing solution and indicator solution, valves 7, 12, and 29 may again be closed during the period of calibration. Or, if the supply of solution in mixing tank 2 is sufficient, these valves may be left open.

The current is now turned on in the incandescent lamp 38, and by adjustment of the adjustable slits 43 and 49, and rotation of the constant deviation dispersion prism 44, a light band of suitable wave lengths is directed upon the light splitting prism assembly 50, from which the two beams of light will be directed onto the photoelectric cells 61 and 62. By means of the adjustable iris diaphragms 59 and 60, and the movable contact 74, the output from the two photoelectric cells 61 and 62 will be balanced so that the galvanometer 72 shows no flow of current. The adjustable contacts 77 and 78 are then set a short distance away from the ends of the contact bar 76. The entire optical photo-electric and automatic bridge system is now balanced and ready for operation.

The three-way valve 100 is set in a neutral position in which it is closed both to acid and alkaline supply from the acid supply tank 115 and the hydroxide supply tank 116, the valves 111 and 114 are opened, power is turned on in the power lines 89, the valves 7, 12, and 29 are again opened, and the control system is ready for operation.

The operation of my device is as follows: as long as the processing solution flowing through the pipe 5 from the mixing tank 2 is at the normal pH value of 9.4, the continuous sample in the solution cell 27, to which a certain proportion of phenolphthalein was added in the Venturi tube 15, will remain unchanged in color or transmission, and the automatic bridge will stay in balance. Let us assume, however, that the processing solution becomes more acid than normal; in other words, that the pH falls below 9.4. In this case the solution in the solution cell 27 will become a lighter red in color, and the transmission of light will increase. Under the influence of this greater amount of light, the resistance of the photo-electric cell 62 will diminish, the automatic bridge 71 will be thrown out of balance, and the automatic mechanism thereof will move the sliding contact 74 to the right, to restore balance. The contact bar 76 will now engage the adjustable contact 77, thus energizing and closing the relay 83. The reverse field coil 86 and the armature 91 of the reversible motor 90 will now be energized, and the valve control mechanism 102 will be operated to open the three way valve 100 in such a manner as to admit alkaline solution from the hydroxide storage tank 116 to the mixing tank 2. Depending upon the type of valve control mechanism which has been selected, the three way valve 100 may be opened completely or held open to various degrees, continuously or for short periods at intervals, but in any case alkaline solution is more or less continuously introduced to the mixing tank 2, where it is thoroughly mixed with the processing solution by the agitator 3.

As the admixture of alkaline solution to the processing solution in mixing tank 2 increases the pH toward the normal value of 9.4, the continuous sample in solution cell 27 will decrease in transmission until the condition existing during calibration is restored, when the automatic bridge will again move the sliding contact 74 to the calibrated position and break the contact between the contact bar 76 and the adjustable contact 77; the three-way valve 100 will then completely close.

In case the solution becomes more alkaline than normal, the pH will increase. The transmission through the solution cell 27 will diminish, the resistance of the photo-electric cell 62 will increase, and the automatic mechanism of the automatic bridge 71 will move the sliding contact 74 to the left. Contact will now be made between the contact bar 76 and the adjustable contact 78, the relay 82 will be energized, and the reversible motor 90, now turning in a forward direction, will operate the valve control mechanism 102 to admit acid from the acid storage tank 115 to the mixing tank 2 until the continuous sample of solution in the solution cell 27 again closely approaches a normal value.

Figure 7:
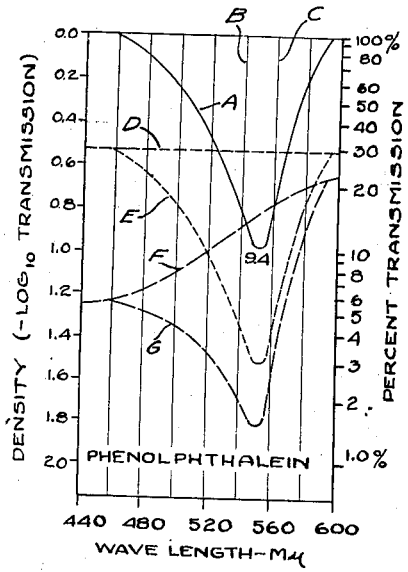

It will be evident from the foregoing description of the operation of my device that any slight variation in transmission through the solution cell 27 with no change in transmission through the comparison cell 10 will unbalance the automatic bridge and set the corrective control mechanism into operation. It is further evident that a change in turbidity or color of the processing solution with no change in its hydrogen ion concentration will not affect the balance of the automatic bridge, since any such change in turbidity or color will affect equally the transmission through the comparison cell 10 and the solution cell 27. Reference to Figure 7 will make this clear.

Curve A of Figure 7 represents the transmission curve of the solution cell 27, with a clear processing solution at a normal pH of 9.4, a length of light path of 5 cm., and an indicator concentration of 0.10 gm. per liter. The horizontal axis of 0.0 density, or 100% transmission, represents the transmission through the comparison cell 10. If we are working with a light band between the wave lengths of 540 and 560 millimicrons, represented by the zone between lines B and C, the transmission through the solution cell 27 will be slightly over 10%, and that through the comparison cell 10 will be 100%.

Let us assume that the processing solution becomes turbid and its transmission is reduced to about 30% of normal. Then the horizontal dotted line D will represent the transmission through the comparison cell 10, and the dotted curve E will represent the transmission through the solution cell 27. The band from 540 to 560 millimicrons will now have a 30% transmission through the comparison cell 10, and slightly over 3% transmission through the solution cell 27, but in each case the transmission is reduced by the same percentage due to the turbidity, and the ratio of transmissions through the comparison cell 10 and the solution cell 27 remains unchanged, and the system will stay in balance.

Curve F represents the transmission through the comparison cell 10 when the solution changes color toward the red and the transmission is at the same time greatly reduced. Curve G now represents the transmission through the solution cell 27. The transmission through the comparison cell 10 at our selected band will now be about 15%, and the transmission through the solution cell 27 will be somewhat over 1.5%, but as in the example just cited above the ratio of transmissions will remain unchanged and the system will stay in balance.

(Study of the curves in Figures 6 and 7 will make it evident that the sensitivity of response to my device may be varied over a wide range by selection of the width of the light band and its placement in the spectrum, but in all cases changes in color or turbidity of the processing solution itself will not affect the balance of the system, while at the same time any change in hydrogen ion concentration will bring about a relative change in transmission between the comparison cell 10 and the solution cell 27, and thus cause the corrective apparatus to function.)

The foregoing description and explanation have made clear the manner in which the preferred form of my apparatus may be used with a single color indicator. To demonstrate its use with a two color indicator, let us assume that the hydrogen ion concentration is to be held at a normal pH value of 7.0. A suitable indicator for this value will then be dibrothymolsulphonphthalein, commonly known as bromthymol blue. Bromthymol blue is yellow at pH values of 6.0 or less, purple at pH values of 8.4 or more, and mixed in color between these two limits.

Figure 8:
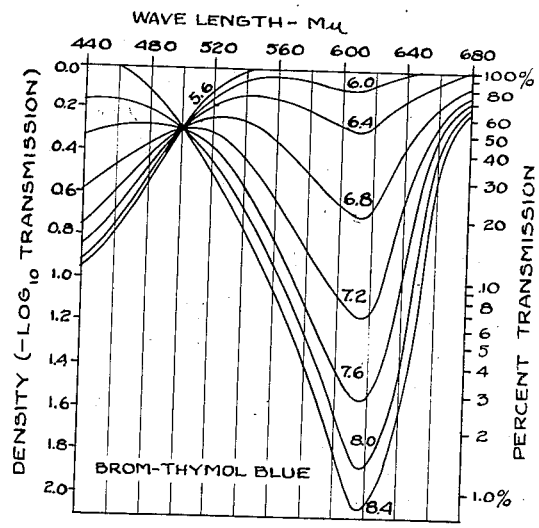

Figure 8 from Clark (supra) shows characteristic transmission curves for this indicator through a light path 5.0 cm. in length at an indicator concentration of 0.40 gm. per liter. Examination of this figure shows that the maximum rate of change of transmission with change of pH occurs at two wave lengths, 440 and 615 millimicrons. If the data were available a still greater rate of change would probably be found at a wave length somewhat shorter than 440 millimicrons, but for purposes of illustration the present data are sufficient.

Figure 9:
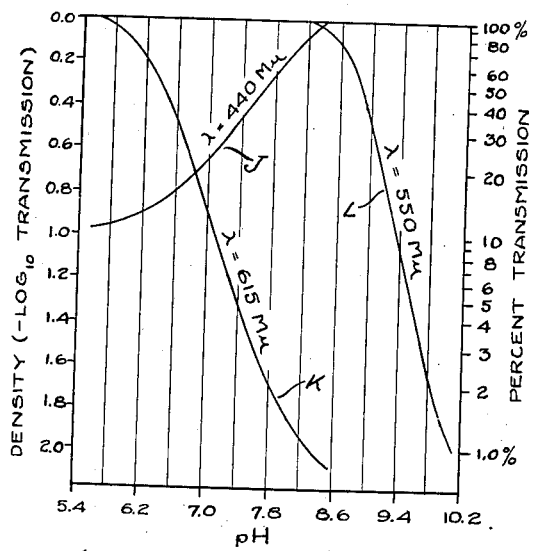

In Figure 9, the curve J shows the densities and transmissions at a wave length of 440 millimicrons plotted against various pH values, while the curve K shows the densities and transmissions at a wave length of 615 millimicrons similarly plotted. It will be seen that at a pH value of 7.0, the rate of change of transmission with change of pH is near the maximum for each of the selected wave lengths. (As a matter of interest to show the different characteristics of indicators, curve L has been plotted from the data set forth in Figure 6. Comparison of the three curves makes it evident, for example, that phenolphthalein, at a wave length of 550 millimicrons, changes in transmission somewhat more rapidly than bromthymol blue at a wave length of 615 millimicrons, and very much more rapidly than does the latter at a wave length of 440 millimicrons. It is also clear that phenolphthalein covers a narrower range of pH values than does bromthymol blue.)

Calibration of the apparatus shown in Figures 1 and 2 for the use of bromthymol blue at a pH of 7.0 will be effected in a manner similar to the calibration with phenolphthalein set forth above, except that a wave band in the neighborhood of 615 millimicrons would be selected.

Let us assume, however, that photo-electric cells are used which have a relatively high response to the shorter wave lengths, with greater response at 440 millimicrons than at 615 millimicrons. It may then be advantageous to use light of the shorter wave length, since the relatively flat slope of the curve J in Figure 9 will be more than compensated for by the higher response of the photo-electric cell to such light.

It should be noted in Figures 8 and 9 that the change of transmission is opposite in direction at the two wave lengths under discussion; that is, any change of hydrogen ion concentration which tends to diminish the transmission of bromthymol blue at 615 millimicrons will increase the transmission at 440 millimicrons, and vice versa. If a wave length of 440 millimicrons is now used, it is obvious that the leads 80 and 81 of Figure 1 should be reversed, or the connections to the field terminals of the reversible motor 90 should be reversed, in order that any acid or alkaline solution supplied to the mixing tank 2 by the functioning of the control mechanism shall be corrective in its effect.

Figure 3:
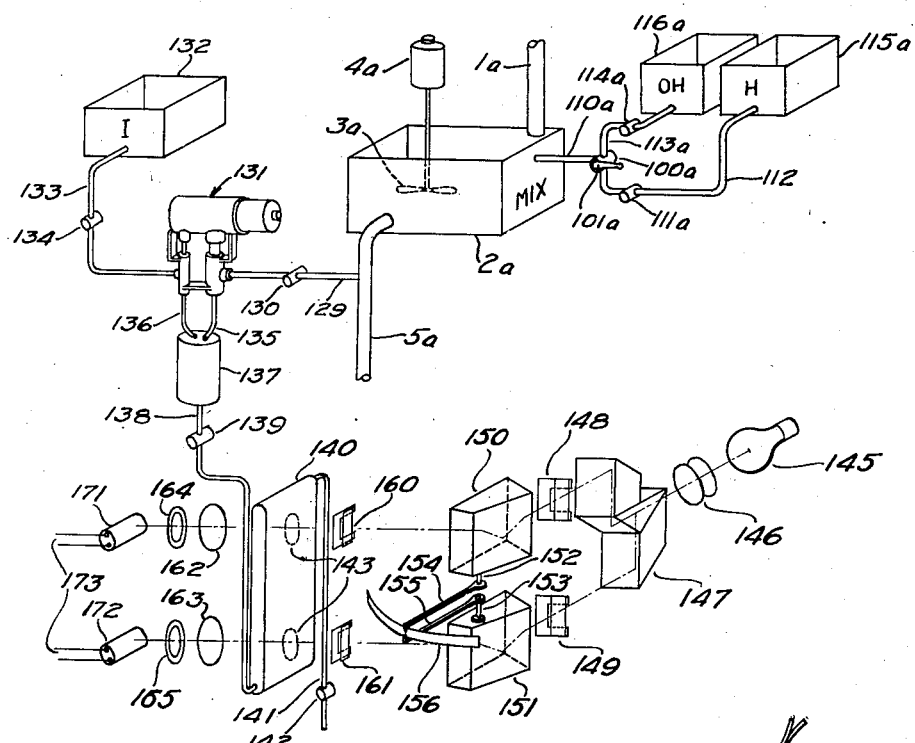
Figure 3 is a schematic perspective view of another embodiment of my invention particularly suited to certain limited operating conditions, using "two-color" indicators.

With reference now to Figure 3, there is here shown another form of my apparatus, particularly adapted to use with two-color indicators on processing solutions which are not subject to color or turbidity change. In this drawing, 1a, 2a, 3a, 4a, and 5a correspond to the pipe 1, the mixing tank 2, the agitator 3, the motor 4 and the pipe 5 of Figure 1. Similarly, 100a, 101a, 110a, 111a, 112a, 113a, 114a, 115a, and 116a correspond identically to the parts of the acid and hydroxide supply system shown in Figure 1.

From the pipe 5a a sample of the processing solution is drawn off through a pipe 129 and a valve 130 by a proportioning pump 131. Indicator solution in an indicator storage tank 132 is drawn through a pipe 133 and a valve 134 by the proportioning pump 131. The proportioned quantities of processing solution and indicator solution are discharged through pipes 135 and 136 into a mixing chamber 137. From the mixing chamber 137 the mixture of processing solution and indicator flows through a pipe 138 and a valve 139 to a solution cell 140, from which it flows through a pipe 141 and a valve 142 to a waste or recovery sump. The solution cell 140 is of a construction similar to the comparison cell 10 and the solution cell 27 of Figure 1, and is covered with opaque material except within the area of the circles 143.

Light from an incandescent lamp 145 passes through a collimator 146, a light splitting prism assembly 147, and adjustable slits 148 and 149, to a pair of constant deviation dispersion prisms 150 and 151. These constant deviation dispersion prisms 150 and 151 are carried on shafts 152 and 153, and may be rotated by means of pointers 154 and 155, which may be fixed by means not shown at any selected position along a curved scale 156. The two beams of light from the constant deviation dispersion prisms 150 and 151 pass through adjustable slits 160 and 161, the solution cell 140, plano-convex lenses 162 and 163, and iris diaphragms 164 and 165, to photo-electric cells 171 and 172.

The photo-electric cells 171 and 172 are connected by leads 173 to an automatic bridge (not shown) in the same manner as were the photo-electric cells 61 and 62 of the preferred embodiment of my invention shown in Figures 1 and 2, and the remainder of the control apparatus serving to operate the three-way valve 100a in response to the photo-electric cells 171 and 172 may be identical with that shown in Figure 1 for operating the three-way valve 100 in response to the photo-electric cells 61 and 62.

To illustrate the calibration and operation of the form of my invention shown in Figure 3, let us assume that it is desired to control a solution at a normal pH of 7.0. For this purpose we may select the two-color indicator bromthymol blue of which the characteristics have been discussed.

Calibration of this form of my invention is effected in the following manner: Assuming that all valves are closed and the system is clean, the mixing tank 2a is filled with processing solution or a standard buffer solution at the desired pH value of 7.0, and valves 130, 134, 139, and 142 are opened and the proportioning pump 131 started to give a small but continuous flow of solutions into the mixing chamber 137 and through the solution cell 140. The incandescent lamp 145 is turned on, the constant deviation dispersion prisms 150 and 151 are rotated to pass bands of light at approximately 440 and 615 millimicrons, respectively, to the photo-electric cells 171 and 172. By means of the adjustable iris diaphragms 164 and 165 and the sliding contact of the automatic bridge (not shown) the system is balanced and adjustments are made exactly as set forth in the description of the calibration method for the preferred form of my invention shown in Figure 1.

The three-way valve 100a is set in a neutral position, the valves 111a and 114a are opened, power is supplied to the control circuit (not shown) and the system is ready for operation.

Let us assume that the constant deviation dispersion prism 150 has been adjusted to give us a light band in the neighborhood of 440 millimicrons, and that the constant deviation dispersion prism 151 has been adjusted to give us a light band in the neighborhood of 615 millimicrons. Referring to Figure 9, it will be seen that the transmission of the shorter wave length at the desired pH value of 7.0 is about 23%, while that of the longer wave length is about 13%.

If the solution becomes more alkaline than normal and the pH increases above 7.0, the transmission at 440 millimicrons will increase, while at 615 millimicrons it will decrease. This will result in a greater amount of light incident upon the photo-electric cell 171, a lesser amount of light incident upon the photo-electric cell 172 and a rapid unbalancing of the circuit with consequent operation of the corrective mechanism to introduce acid solution.

If, on the other hand, the solution becomes more acid than normal, the transmission will decrease at 440 millimicrons and increase at 615 millimicrons, the automatic bridge will become unbalanced in direction opposite to the unbalance in the example just cited, and the corrective mechanism will introduce alkaline solution.

It should be pointed out that if curves similar to curves D, E, F, and G in Figure 7 are plotted for the indicator shown in Figure 8, it will become evident that the system just described will be unbalanced by any color or turbidity change which produces different changes of transmission at the two wave lengths selected. On the other hand, this apparatus will be more sensitive than an apparatus in which change of transmission with change of hydrogen ion concentration occurs in only one of the solution cells, and in cases where there is no danger of a change of color or turbidity, this additional sensitivity may be advantageously utilized.

Figure 4:
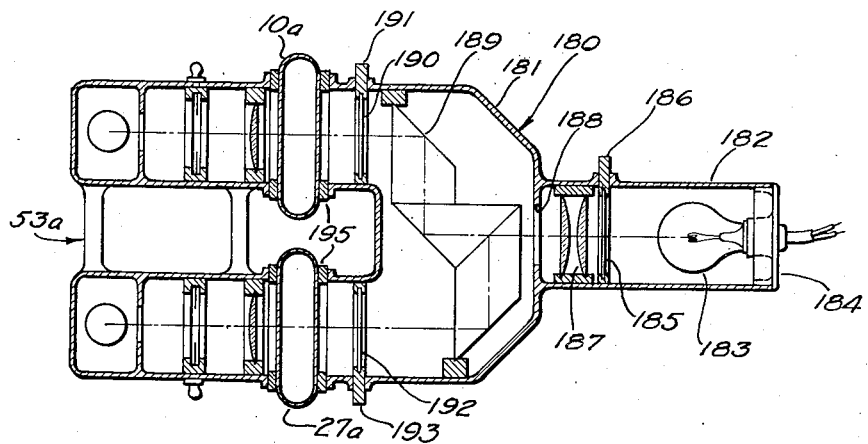
Figure 4 is an elevational section through an alternate form of optical system which may be used in place of the optical systems shown in Figure 2 or Figure 3.

With reference now to Figure 4, there is here shown an optical system which substitutes filters of any selected characteristics for the constant deviation dispersion prisms and adjustable slits of the forms of my invention shown in Figures 1, 2, and 3.

180 is an optical housing composed of a prism housing 181, and a lamp housing 182. A lamp 183 is supported by a base 184 in the end of the lamp housing 182. Light from the lamp 183 passes through a filter 185 in a removable filter frame 186, which is inserted through the wall of the lamp housing 182, and into a collimator 187, where its rays are rendered parallel. From the collimator 187 the parallel rays of light pass through an opening 188 in the wall of the prism housing 181, and into a beam-splitting prism assembly 189. The upper beam of light from the beam splitting prism assembly 189 passes through a filter 190 in a removable filter frame 191 which is inserted through the wall of the prism housing 181, and the lower beam of light passes through a filter 192 in a removable filter frame 193 similarly inserted through the wall of the prism housing 181.

The optical housing 180 is held by means not shown against a comparison cell 10a and a solution cell 27a, and a light seal is provided by gaskets 195. The comparison cell 10a and the solution cell 27a are identical in structure and function with the comparison cell 10 and the solution cell 27 of Figures 1 and 2. Against the opposite faces of the comparison cell 10a and the solution cell 27a is mounted (by means not shown) a photo-cell housing 53a, which is identical in structure and function with the photo-cell housing 53 of Figure 2.

When this optical system is used in lieu of the system shown in Figures 1 and 2, the filter 185 is selected to pass the desired light band and the filters 190 and 192 are removed, or if the desirable filtering effect is best obtained by the use of two filters in series, the filters 190 and 192 may be similar in characteristics and chosen to cooperate with the filter 185 to produce the desired effect.

In case it is desired to represent this optical system in the form in which it would be substituted for the system shown in Figure 3, then a single solution cell corresponding to the solution cell 140 of that figure would be substituted for the comparison cell 10a and the solution cell 27a of Figure 4, and the filter combinations of filters 185, 190, and 192 would be so selected as to give the different wave bands required in the upper and lower light paths.

Figure 5:
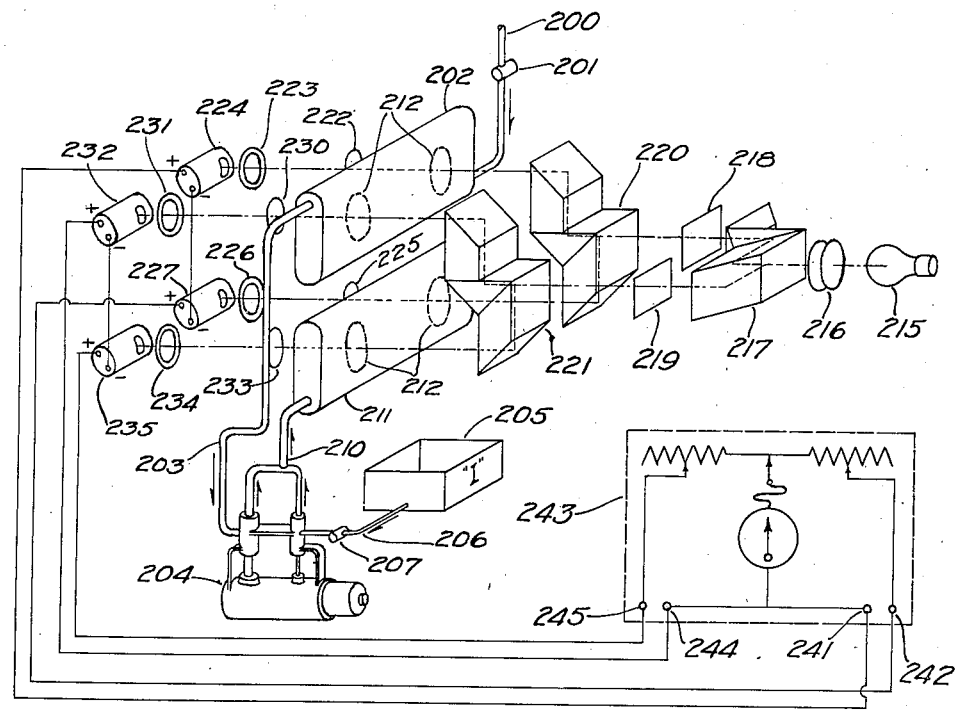
Figure 5 is a schematic perspective view of another embodiment of my invention which makes it possible to take full advantage of the characteristics of "two-color" indicators.

With reference now to Figure 5, there is here shown an embodiment of my invention which is possessed of the sensitivity of the apparatus shown in Figure 3, while at the same time it compensates for change in color or turbidity of the processing solution.

A sample of the processing solution to be tested is drawn from a point in the process (not shown) through a pipe 200 and a valve 201 into a comparison cell 202, from which it is in turn drawn through a pipe 203 into a proportioning pump 204. Indicator solution from a tank 205 is drawn through a pipe 206 and a valve 207 by the proportioning pump 204. The proportioned quantities of processing solution and indicator solution are forced by the proportioning pump into the branched pipe 210, where they are mixed and from which they are delivered to a solution cell 211. A drain pipe (not shown) carries the solutions from solution cell 211 to a waste pipe. As in the case of the other forms of my apparatus previously described, the comparison cell 202 and the solution cell 211 are covered with opaque material leaving translucent windows 212.

Light from an incandescent lamp 215 passes through a collimator 216 into a beam-splitting prism assembly 217, from which two beams of light emerge and pass through filters 218 and 219 into beam-splitting prism assemblies 220 and 221. The upper beam of light from the beam-splitting prism assembly 220 passes through the comparison cell 202, a plano-convex lens 222 and an adjustable iris diaphragm 223 into a photo-electric cell 224. The lower beam of light from the beam-splitting prism assembly 220 passes through the solution cell 211, a plano-convex lens 225, and an adjustable iris diaphragm 226 into a photo-electric cell 227.

The upper beam of light from the beam-splitting prism assembly 221 passes through the comparison cell 222, a plano-convex lens 230 and an adjustable iris diaphragm 231 into a photo-electric cell 232. The lower beam of light from the beam-splitting prism assembly 221 passes through the solution cell 211, a plano-convex lens 233 and an adjustable iris diaphragm 234 into a photo-electric cell 235.

The photo-electric cells 224, 227, 232, and 235 are of the photo-voltaic type. The photo-electric cells 224 and 227 are connected in opposed series, as shown, to terminals 241 and 242 of a balancing bridge 243. The photo-electric cells 232 and 235 are similarly connected in opposed series to a pair of terminals 244 and 245 of the balancing bridge 243. Except for the fact that the use of photo-voltaic cells renders a battery unnecessary, the balancing bridge 243 may be identical with the automatic bridge 71 of Figure 1, and in this case will automatically balance, and operate relay contacts when the balancing mechanism shifts materially from the calibrated position.

Let us assume that the embodiment of my invention shown in Figure 5 is to be used to control a processing solution at a pH of 7.0. We will then select, as in the previous example, bromthymol blue for an indicator, and the filters 218 and 219 will be chosen to transmit a maximum amount of light at wave lengths of 440 and 615 millimicrons respectively. The indicator storage tank 205 is filled with an appropriate solution of bromthymol blue, a processing or buffer solution at a predetermined pH value of 7.0 is supplied to the pipe 200, valve 201 is opened, and the proportioning pump 204 is set into operation. The incandescent lamp 215 is lighted, and the system is ready for balancing.

The series circuit through the photo-electric cells 232 and 235 is broken, let us say by loosening the terminal 245, and by means of the adjustable iris diaphragms 223 and 226, the output of the photo-electric cells 224 and 227 is so balanced that the galvanometer of the balancing bridge 243 will indicate that the terminals 241 and 242 are at an equal potential.

The terminal 245 is now tightened, the terminal 242 is disconnected, and the photo-electric cells 232 and 235 are similarly balanced by means of the adjustable iris diaphragms 231 and 234. The terminal 242 is now re-connected, and the system is ready for operation.

If the processing solution becomes more acid than normal, the transmission through the solution cell 211 at a wave length of 615 millimicrons will increase, and at a wave length of 440 millimicrons will decrease. An increased amount of light will fall upon the photo-electric cell 235 and a decreased amount of light will fall upon the photo-electric cell 227. The photo-electric cell 235 will now overcome the opposed potential of the photo-electric cell 232, thus rendering terminal 245 positive in polarity and terminal 244 negative. Similarly, the photo-electric cell 224 will overcome the lessened potential of the photo-electric cell 227, the terminal 241 will become positive and the terminal 242 will become negative. With the wiring diagram as shown in the balancing bridge, the galvanometer will now indicate unbalance. If the bridge is of the automatic balancing type, the balancing mechanism will function and operate relay control contacts to effect admixture of corrective alkaline solution to the processing solution.

If, on the other hand, the processing solution becomes more alkaline than normal, the voltage of the photo-electric cell 227 will increase, that of the photo-electric cell 235 will decrease, the balancing bridge 243 will become unbalanced in the opposite direction, and the galvanometer will indicate accordingly. If the bridge is of the automatically balancing type, it will then operate a relay to admit acid to the processing solution.

It is evident that any change of color or turbidity of the processing solution unaccompanied by any change of hydrogen ion concentration will not affect the balance of this system, since the four beams of light striking the four photo-electric cells will be equally affected.

While I have in the foregoing description of construction and method of operation of various forms of my invention used selected wave length bands of light, this was done for the purpose of maintaining high sensitivity and is not always essential. Study of Figures 6 and 7 will make this point clear.

If a total reflection prism is substituted for the constant deviation dispersion prism of Figures 1 and 2, or if the optical system of Figure 4 is used without filters, then white light or light of the color emanating from the light source will pass through both the upper and lower light paths. If we assume that this light covers the entire range from 440 to 600 millimicrons, shown in Figures 6 and 7, then it will be evident that with a perfectly clear solution at a normal pH of 9.4, the transmission through the comparison cell will be represented by the horizontal line of zero density or 100% transmission of Figure 7, while the transmission through the solution cell will be represented by curve A. Similarly, the transmission through a turbid solution in the comparison cell may be represented by the horizontal line D, and the corresponding transmission through the solution cell by the curve E. In like manner, the transmission through a colored solution in the comparison cell may be represented by the curve F, and the corresponding transmission through the solution in the solution cell by the curve G.

In any case, a change of hydrogen ion concentration will bring about a change in the total amount of light transmitted through the solution cell, but will not produce any change in the amount of light transmitted through the comparison cell, and the apparatus will function in the manner originally described. On the other hand, any change of color or turbidity will bring about equivalent changes in transmission through both the solution cell and the comparison cell, and leave the system balanced. From the shape of the characteristic curves in the family of curves shown in Figure 6, it will be evident however that if the full range of wave lengths from 440 to 600 millimicrons is used, a given change in the hydrogen ion concentration will produce a smaller percentage change in transmission through the solution cell than if a narrower band spanning the peak values of density had been selected. The sensitivity of the apparatus will therefore be somewhat lessened, but the apparatus itself will be somewhat simplified.

If due consideration is given to the response characteristics of photo-electric cells at different wave lengths, it will often be found advantageous to select light bands of high intensity at the wave lengths of maximum response. One example of this technique was given in the discussion of the use of the shorter wave lengths of light in conjunction with the description of the method of operation of the device shown in Figure 3.

In special cases where extreme sensitivity of response and control is desired, or where the opacity of the solution or insufficient response of the photo-electric cells may make it desirable or necessary, suitable amplifier circuits may be used between the photo-electric cells and the bridge. The design and construction of such circuits will be familiar to those skilled in the art involved.

While I have not shown a wiring diagram for the use of photo-electric cells of the electron emission type, exemplified by the potassium oxide and caesium oxide cells, the adaptation of such cells to any of the embodiments of my apparatus shown will be readily understood by those skilled in the art.

Various modifications or simplifications of my apparatus and its method of use may be effected in the application thereof to specific control purposes. Referring to Figure 1, and assuming that the processing solution is of such nature that it always tends to become more alkaline than normal and needs only addition of acid for correction, the hydroxide storage tank 116, the valve 114, and the pipe 113 may be eliminated, and the three-way valve 100 with its attendant control mechanism and relays replaced by less elaborate apparatus. In case the solution always tends to become more acid than normal, and requires only the addition of corrective hydroxide material, a similar simplification can be made.

In case the processing solution is of such character that it does not change in color or turbidity, the apparatus shown in Figure 1 may be simplified by eliminating the beam-splitting prism assembly 50, the comparison cell 10, the plano-convex lens 57, the adjustable iris diaphragm 59, and by substituting for the photoelectric cell 61 a standard resistance. The constant deviation dispersion prism 44 will now be so situated that the light therefrom will pass directly through the solution cell 27, the plano-convex lens 58, and the adjustable iris diaphragm 60 to the photo-electric cell 62. Calibration and operation of the device in this form will be identical with that set forth for the device shown in Figures 1 and 2. It will be evident that as long as the processing solution remains unchanged in color or turbidity, this form of the device will respond to and serve to correct variations in hydrogen ion concentration of the solution in a manner identical with the preferred form of my invention.

In case it is desired to admit corrective material in a solid form to the processing solution, suitable conveyors or material feeders may be substituted for the three-way valve 100 with its attendant control mechanism, and the relay panel 84 may be used to operate such conveyors or material feeders.

In the application of the various embodiments of my invention to the specific problems of industry, various other modifications thereof will suggest themselves to those skilled in the art, but I have in the foregoing specification described in detail a method and apparatus of great novelty and utility, and I therefore claim as my invention:

1. The method of controlling the pH of a solution which includes: drawing off a sample of said solution and adding an indicator thereto; drawing off another sample of the original solution; confining said samples within defined limits; passing two beams of light through said first sample on to separate photo cells, said beams being of different relatively narrow spectral ranges; passing two beams of light through said second sample, said beams corresponding respectively in spectral range to said first mentioned beams; and varying the pH of said solution by means of said photo cells in response to variations in the light transmission characteristics of said sample containing indicator.

2. Apparatus for controlling the pH of a solution which includes: means for drawing off a sample of said solution and adding an indicator thereto; means for drawing off a second sample of said solution; means for projecting separate light beams through each sample, said beams being of the same spectral range; means for projecting other light beams through a different portion of each sample, said second beams being of a similar spectral range but different from the range of said first mentioned beams; and control means for varying the pH of said solution in response to variations of the light transmission characteristics of said first sample.

3. The method of controlling the pH of a fluid which includes: adding indicator to a portion of said fluid; passing two beams of light of different spectral ranges through said fluid portion onto separate photo-cells; passing two beams of light corresponding respectively in spectral range to said first beams, through a portion of said fluid to which indicator has not been added onto other photocells; and varying the pH of said fluid by means of said photocells in response to variations in the transmission of said fluid portion containing indicator.

DONALD K. ALLISON.